(12) United States Patent
Govani et al.

(10) Patent No.: US 8,103,652 B2
(45) Date of Patent: Jan. 24, 2012

(54) INDEXING EXPLICITLY-SPECIFIED QUICK-LINK DATA FOR WEB PAGES

(75) Inventors: Tabreez Govani, Mukilteo, WA (US); Srinath Aaleti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/030,330

(22) Filed: Feb. 13, 2008

(65) Prior Publication Data

US 2009/0204579 A1 Aug. 13, 2009

(51) Int. Cl.
G06F 7/00 (2006.01)
G06F 17/30 (2006.01)
(52) U.S. Cl. .................................... 707/711; 707/706
(58) Field of Classification Search ............. 707/711, 707/706
See application file for complete search history.

(56) References Cited

U.S. PATENT DOCUMENTS

| | | | |
|---|---|---|---|
| 7,020,679 B2 | 3/2006 | Tian | |
| 7,225,187 B2 | 5/2007 | Dumais | |
| 7,240,064 B2 | 7/2007 | Risvik | |
| 2004/0240642 A1* | 12/2004 | Crandell et al. | 379/88.22 |
| 2006/0004691 A1* | 1/2006 | Sifry | 707/1 |
| 2006/0026534 A1 | 2/2006 | Ruthfield | |
| 2006/0085280 A1 | 4/2006 | Murnan | |
| 2006/0106784 A1* | 5/2006 | Alpha | 707/3 |
| 2006/0112110 A1* | 5/2006 | Maymir-Ducharme et al. | 707/100 |
| 2006/0167857 A1 | 7/2006 | Kraft | |
| 2007/0038608 A1 | 2/2007 | Chen | |
| 2007/0143306 A1* | 6/2007 | Yang | 707/10 |
| 2007/0208713 A1 | 9/2007 | Krishnaprasad | |
| 2007/0219980 A1 | 9/2007 | Songfack | |

OTHER PUBLICATIONS

Chen, Hsinchun et al., "CI Spider: a Tool for Competitive Intelligence on the Web", http://citeseer.ist.psu.edu/cache/papers/cs/26786/http:zSzzSzai.bpa.arizona.eduzSz~mchauzSz.zSzpaperszSzCISpider.pdf/chen02ci.pdf.

Steinbeger, R. et al., "Continuous Multi-Source Information Gathering and Classification", http://langtech.jrc.it/Documents/CIMCA-03_Ribeiro-Steinberger-et-al.pdf.

Ester, Martin et al., "Accurate and Efficient Crawling for Relevant Websites", http://www.isys.ucl.ac.be/vldb04/eProceedings/contents/pdf/RS10P3.PDF.

Yahoo Search Results Add Quick Links, http://www.searchenginejournal.com/yahoo-search-results-add-quick-links/2231/.

* cited by examiner

Primary Examiner — Charles Lu
(74) Attorney, Agent, or Firm — Shook, Hardy & Bacon L.L.P.

(57) ABSTRACT

Systems, methods, and computer storage media having computer-executable instructions embodied thereon for permitting webmasters to explicitly specify links or other web pages that the webmaster believes visitors to the web site or web page are interested in viewing are provided. Systems and methods for identifying explicitly-specified site-link data upon crawling the web site, indexing the site-link data in association with the web site or a web page, and exposing at least a portion of such site-link data when the associated web site and/or web page surfaces as the result of an input search query are also provided.

12 Claims, 6 Drawing Sheets

← 600

---

EXAMPLE NEWS WEB PAGE- BREAKING NEWS, WORLD NEWS & MULTIMEDIA

THE BUSH ADMINISTRATION HAS ADOPTED STANDARDS TO MAKE IT MUCH HARDER FOR STATES TO ... INSIDE EXAMPLENEWS.COM
WWW.EXAMPLENEWS.COM

- DATE
  - WORLD – WWW.EXAMPLENEWS.COM/PAGES/WORLD/INDEX.H...
  - OPINION – WWW.EXAMPLENEWS.COM/PAGES/OPINION/INDEX...
  - BUSINESS – WWW.EXAMPLENEWS.COM/PAGES/BUSINESS/INDE...
  - JOB MARKET – JOBMARKET.EXAMPLENEWS.COM/PAGES/JOBS

EXAMPLE NEWS WEB PAGE- BREAKING NEWS, WORLD NEWS & MULTIMEDIA

THE BUSH ADMINISTRATION HAS ADOPTED STANDARDS TO MAKE IT MUCH HARDER FOR STATES TO ... INSIDE EXAMPLENEWS.COM
WWW.EXAMPLENEWS.COM

- DATE
  - WORLD - OPINION - BUSINESS - JOBMARKET

INDEXING EXPLICITLY-SPECIFIED QUICK-LINK DATA FOR WEB PAGES

BACKGROUND

When a user visits a web page, the user often visits other links within the same or an associated domain. To save users time, search engines often expose some of these other links with a search engine result. Often, users are more interested in some of the other links than they are in the actual result that the search engine returns. However, to maximize the benefit to a user, a search engine must anticipate what the user actually desires to view, to the extent that such desire does not accurately match the input search query. This is a difficult task at best, particularly when the web site is either less popular or otherwise has limited viewer-history associated with it.

SUMMARY

Embodiments of the present invention relate to systems and methods for permitting webmasters or others involved in the building of a web site to explicitly specify links or other web pages that the webmaster believes users that visit the web site are interested in viewing. Such links may be manually specified or automatically generated by, for instance, a webmaster tool that examines the site visit logs for a web site and automatically outputs such links when requested by a crawler. Such links or other web pages are referred to herein as "site-link data" or "quick-links". Permitting a webmaster to specify such desired link information is beneficial as generally, those building a web site are in a better position than the search engine itself to anticipate a user's actual intended use of the web pages associated the web site, particularly when the web site is either less popular or otherwise has limited viewer-history associated with it. Embodiments of the present invention further relate to systems and methods for identifying such explicitly-specified site-link data (or quick-links) upon crawling the web site, indexing the quick-link in association with the appropriate web page, and exposing at least a portion of such quick-link data when the associated web site and/or web page surfaces as the result of an input search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 6 is a partial illustrative screen display of an exemplary user interface illustrating a presentation of explicitly-specified quick-link data in association with a search result, in accordance with an embodiment of the present invention; and FIG. 7 is a partial illustrative screen display of an exemplary user interface illustrating a presentation of explicitly-specified quick-link data in association with a search result, in accordance with an embodiment of the present invention.

DETAILED DESCRIPTION

Figure 1:
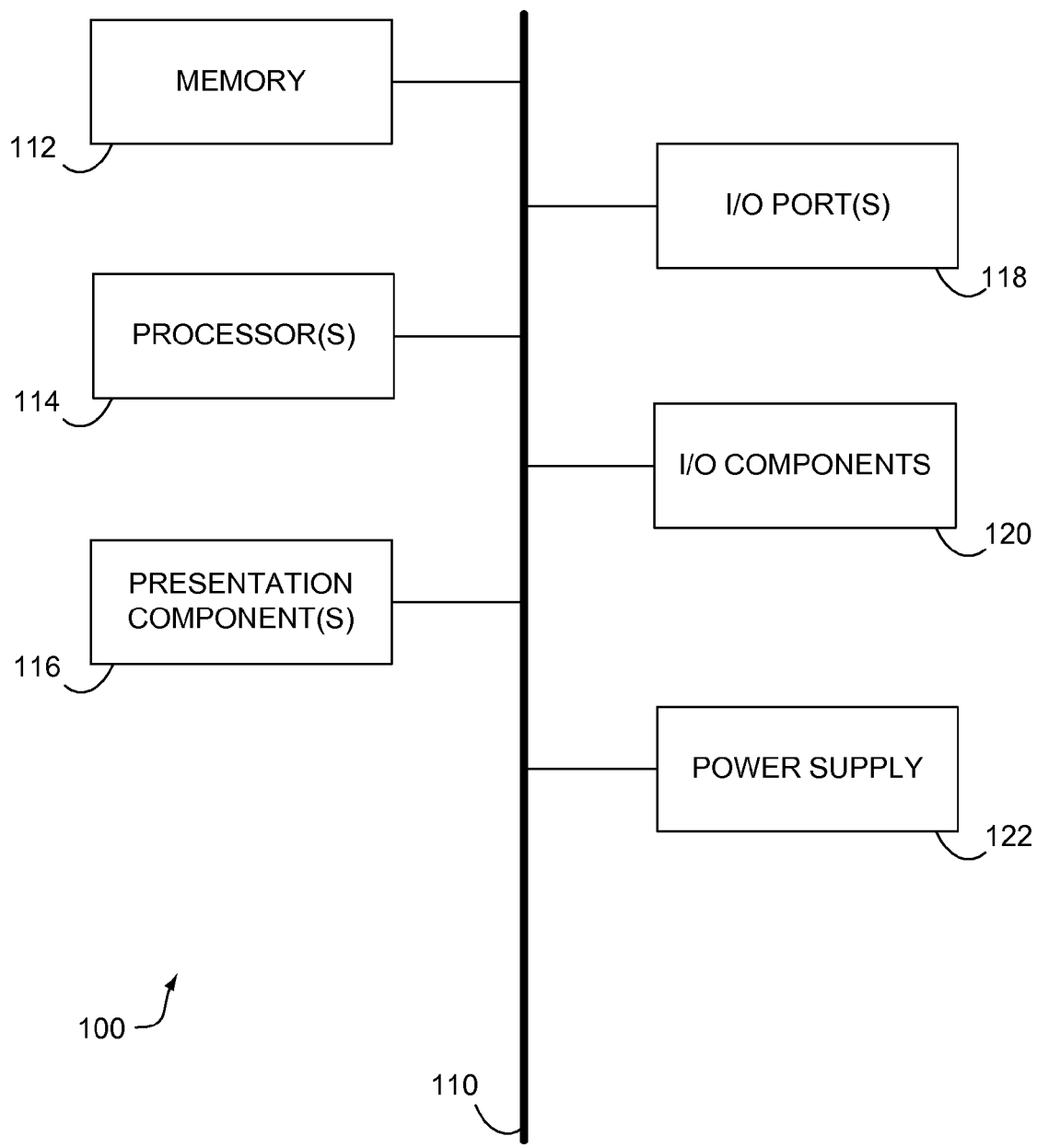
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon for permitting webmasters or others involved in the building of a web site to explicitly specify links or other web pages that the webmaster believes users that visit the web site are interested in viewing. Such links or other web pages are referred to herein as "site-link data", "quick-link data" or "quick-links". Quick-links or site-link data typically include a web page URL and may additionally include a context-aware title corresponding to the web page URL and one or more presentation conditions, as desired. Embodiments further relate to systems and methods for identifying such quick-link data upon crawling the web site, indexing the quick-link data in association with the appropriate web page(s) associated with the web site (or an identifier therefore), and exposing such quick-link data when the associated web site and/or web page surfaces as the result of an input search query.

Accordingly, in one aspect, the present invention is directed to one or more computer storage media having computer-executable instructions embodied thereon for performing a method for indexing explicitly-specified site-link data in association with a web page. The method includes identifying a web page having site-link data associated therewith, the site link data including at least one Uniform Resource Locator (URL), and storing each URL in association with the web page in an index. If desired, the site-link data may additionally include a context aware title associated with each URL. In this embodiment, storing each URL may additionally comprises storing any associated title in association with the URL.

In another aspect, the present invention is directed to a computerized method for presenting site-link data in association with search results. The method includes receiving site-link data and at least one associated web page, receiving a search query, determining the at least one associated web page satisfies the search query, and presenting at least a portion of the site-link data and an identifier for the at least one associated web page.

In yet another aspect, the present invention is directed to one or more computer storage media having computer-executable instructions embodied thereon for performing a method for identifying and presenting explicitly-specified site-link data in association with search results. The method includes crawling web content to identify a web page having explicitly-specified site-link data associated therewith, the explicitly-specified site-link data including a URL and a context-aware title. The method further includes storing the explicitly-specified site-link data in association with the web page in an index, receiving a search query, searching the index to determine that the identified web page satisfies the search query, and presenting the explicitly-specified site-link data in association with the identifier for the web page, wherein the presented explicitly-specified site-link data is selectable to initiate navigation to the URL.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the present invention relate to systems and methods for permitting webmasters or others involved in the building of a web site to explicitly specify links or web pages that the webmaster believes users that visit the web site are interested in viewing. Such links may be manually specified or automatically generated by, for instance, a webmaster tool that examines the site visit logs for a web site and automatically outputs such links when requested by a crawler. Such links or other web pages are referred to herein as "site-link data", "quick-link data" or "quick-links". Quick-links, or site-link data, typically include a web page URL, and may additionally include a context-aware title corresponding to the web page URL and/or one or more presentation conditions, as desired. Thus, quick-link URLs may be URLs having the same domain as a particular web page that a webmaster or other individual associated with building the web page desires to have presented when the web page surfaces as the result of a search query or URLs having a different domain that the webmaster indicates is to be associated as a quick-link. In addition to specifying a quick-link URL, webmasters are also permitted to specify a context-aware title that may be presented in conjunction with or in lieu of the actual quick-link URL. Quick-link data and any associated quick-link title and/or presentation conditions may be specified in a number of ways within the scope of embodiments of the present invention, an exemplary sample of which are further described herein below with reference to FIG. 2. Embodiments of the present invention further relate to systems and methods for identifying such site-link data (or quick-links) upon crawling the web site, indexing the quick-link in association with the appropriate web site and/or web page, and exposing at least a portion of such quick-link data when the associated web site and/or web page surfaces as the result of an input search query.

Figure 2:
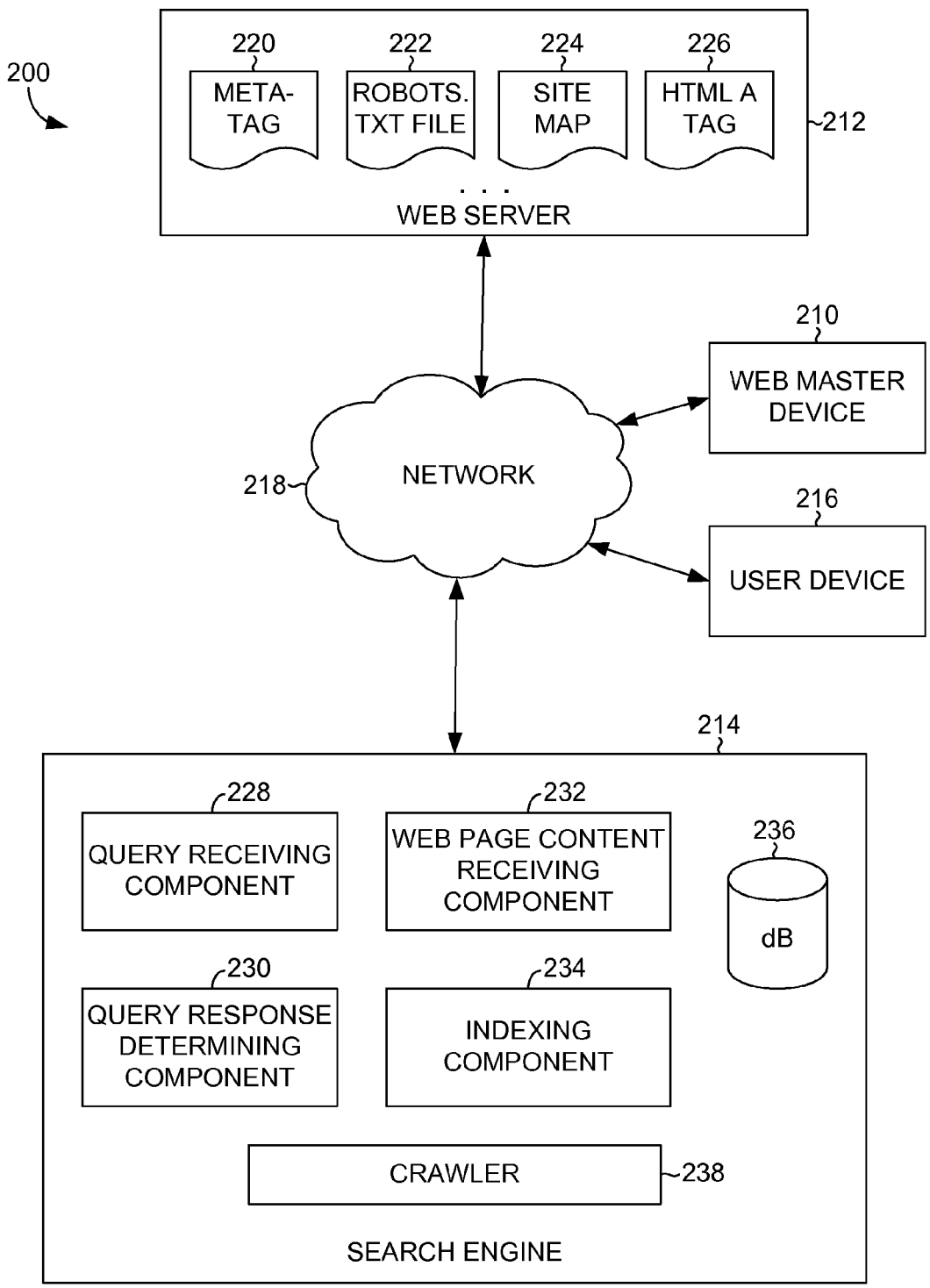
FIG. 2 is a block diagram of an exemplary system in which embodiments of the invention may be employed.

Referring now to FIG. 2, a block diagram is provided illustrating a system 200 that facilitates indexing site-link data in association with web pages, in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 generally includes a webmaster device 210, a web server 212, a search engine 214, and a user device 216, all in communication with one another via a network 218. The network 218 may include, without limitation, one or more local area networks (LANs) and/or wide area networks (WANs). Such networking environments are commonplace in offices, enterprise-wide computing networks, intranets, and the Internet. Accordingly, the network 218 is not further described herein.

Each of the webmaster device 210, the web server 212, the search engine 214 and the user device 216 may comprise any type of computing device, such as, for example, computing device 100 described above with reference to FIG. 1. By way of example only and not limitation, the webmaster device 210, the web server 212, the search engine 214 and the user device 216 each may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of the embodiments hereof.

It should be understood that any number of webmaster devices, web servers, search engines, user devices, and networks may be employed within the system 200 within the scope of embodiments of the present invention. Additionally, although many other components of the system 200 are not shown, those of ordinary skill in the art will appreciate that such components and their interconnections are well known. Accordingly, additional details concerning components not shown in the system 200 are not further disclosed herein.

In accordance with system 200, a webmaster or other individual associated with the building of a web page utilizes the webmaster device 210 to provide web page content and site-link data (or quick-links) to the web server 212 via the network 218. As previously stated, such links may be manually specified or automatically generated by, for instance, a webmaster tool that examines the site visit logs for a web site and automatically outputs such links when requested by a crawler. The quick-link data may include, without limitation, quick-link URLs and, if desired, context-aware titles that describe the quick-link URLs, and the like. Such quick-links may be specified in a number of ways within the scope of embodiments hereof. For instance, and not by way of limitation, quick-links may be provided to the web server 212 utilizing Meta tags 220, robots.txt files 222, sitemaps 224, HTML A tags 226, other places within the HTML associated with a web page (not shown), and other specific files that can be served by the web server 212 (not shown). The web server 212 typically includes at least one data store (not shown) associated therewith for storing the received web page content and quick-link data.

If specified utilizing a Meta tag 220, the webmaster may specify a quick-link (and associated title, if desired) by adding a Meta tag to the HTML of the web page for which they wish to offer a quicklink. By way of example, and not limitation, an HTML snippet for the URL www.examplenews.com may appear as follows:

```
<meta name="quicklink" content=
"www.examplenews.com/pages/world/ index.html World"/>
<meta name="quicklink" content=
"www.examplenews.com/pages/opinion/index.html Opinion"/>
<meta name="quicklink" content=
"www.examplenews.com/pages/business/index.html Business"/>
<meta name="quicklink" content=
www.examplenews.com/pages/jobs Job Market"/>
```

In one embodiment, there is one Meta tag for each quick-link, any number of which may be specified. In the above example, four quick-links have been specified that are respectively associated with the appropriate URLs and the context-aware titles "World", "Opinion", "Business" and "Job Market". The format of the value of the content attribute in this example is URL<space>title, although it will be understood by those or ordinary skill in the art that other separators may be used as well (for e.g., "--", <meta name="quicklink" content="url1--title1"). In another embodiment, this same information may be encoded in a single quicklink (for example, <meta name="quicklink" content="url1 title1 url2 title2 url3 title3"/> will specify all the quick links in just a single Meta tag). It will be understood and appreciated by those of ordinary skill in the art that the above Meta tag examples are intended for exemplary purposes only and are not meant to limit the scope of embodiments of the invention in any way.

If specified utilizing a robots.txt file 222, the webmaster may specify a quick-link (and associated context-aware title, if desired) by adding rules for the robots.txt path such that a desired quicklink may be exposed upon surfacing of the web page. For instance, the webmaster may specify the following:

```
Rules-for-path: /
Quicklink:/pages/world/index.html World
Quicklink:/pages/opinion/index.html Opinion
```

In this example, there is one rule for each quicklink, any number of which may be specified. In the above example, two quicklinks have been specified that are respectively associated with the appropriate URLs and the context-aware titles "World" and "Opinion". It will be understood and appreciated by those of ordinary skill in the art that the above robots.txt example is intended for exemplary purposes only and is not meant to limit the scope of embodiments of the invention in any way.

If specified utilizing a sitemap 224, the webmaster may specify a quick-link (and context-aware title, if desired) by adding rules for the sitemap similar to what was illustrated above with respect to the robots.txt file but in a format that is XML based. For instance, the webmaster may specify the following:

```
<?xml version="1.0" encoding="UTF-8"?>
<urlset xmlns=http://www.sitemaps.org/schemas/sitemap/0.9>
<url>
<loc>http://www.example.com/</loc>
<lastmod>2005-01-01</lastmod>
<changefreq>monthly</changefreq>
<priority>0.8</priority>
<quicklink>
<url>/pages/world/index.html</url>
<title>World</title>
</quicklink>
<quicklink>
<url>/pages/opinion/index.html</url>
<title>Opinion</title>
</quicklink>
</url>
</urlset>
```

In this example, there is one rule for each quick-link, any number of which may be specified. In the above example, two quick-links have been specified that are respectively associated with the appropriate URLs and the context-aware titles "World" and "Opinion". It will be understood and appreciated by those of ordinary skill in the art that the above sitemap example is intended for exemplary purposes only and is not meant to limit the scope of embodiments of the invention in any way.

In a given HTML document for a web page, a quick-link for that web page (and associated title, if desired) may be specified utilizing an HTML A tag 226. In this example, the URL of the quick-link is the HREF value, and the context-aware title is specified in a new attribute of the A tag called, e.g., QLTITLE. The value of QLTITLE is the title for the quicklink. This can be done for any and all A tags in the HTML page. It will be understood and appreciated by those of ordinary skill in the art that the above HTML A tag example is intended for exemplary purposes only and is not meant to limit the scope of embodiments of the invention in any way.

In another embodiment, a webmaster may specify one or more quick-links via a quick-link submission tool associated with the search engine or crawler itself. Such a tool may either deliver the quick-links directly to the search engine or crawler, or build some blob of text (possibly encrypted) that the webmaster may then paste into the desired web page or otherwise on the web site somewhere. The crawler would then interpret the blob appropriately.

It will be understood and appreciated by one or ordinary skill in the art that the same quick-link may be specified utilizing multiple mechanisms such as those listed below. If a quick-link is determined to be specified in multiple locations or utilizing multiple mechanisms, one or more priority rules may be utilized to determine where to get the desired information (e.g., a rule may be set such that if the same quick-link is specified utilizing a Meta tag and a robots.txt file, the Meta tag will be utilized). Any and all such variations are contemplated to be within the scope hereof.

It should be noted that in addition to providing appropriate URLs, and context-aware titles for each desired quick-link, if desired, webmasters may also specify one or more conditions to be associated with a quick-link as part of the quick-link or explicitly-specified site-link data, the condition(s) generally being based upon the content and/or context of a received search query. For instance, a condition indicating that if a search query regarding top news stories is received, the quick-link associated with the "World" context-aware title is to be presented whereas if a search query regarding the unemployment rate is received, the quicklink associated with the "Job Market" context-aware title is to be presented may be provided as part of the quick-link data.

Once one or more quick-links has been provided to a web server in association with a web page, a crawler associated with a search engine (or independent thereof) may access the quick-link data and index such information so that it may be exposed upon surfacing of the web page as a search result. As shown in FIG. 2, the search engine 214 of system 200 includes a query receiving component 228, a query response determining component 230, a web page content receiving component 232, an indexing component 234, a data store 236, and a crawler 238. In some embodiments, one or more of the illustrated components 228, 230, 232, 234, 236, and 238 may be implemented as stand-alone applications. In other embodiments, one or more of the illustrated components 228, 230, 232, 234, 236, and 238 may be integrated directly into the operating system of the search engine 214 or the user device 216. In the instance of multiple web servers, embodiments of the present invention contemplate providing a load balancer to federate incoming queries to the servers. It will be understood by those of ordinary skill in the art that the components 228, 230, 232, 234, 236, and 238 illustrated in FIG. 2 are exemplary in nature and in number and should not be construed as limiting. Any number of components may be employed to achieve the desired functionality within the scope of embodiments of the present invention.

The crawler 238 is a computer program that is configured to gather and categorize information on the Internet. That is, the crawler 238 is a computer program or automated script which browses the content on the Internet in a methodical, automated manner. Crawlers are generally utilized by search engines as a means of providing up-to-date data. While the crawler 238 is crawling the Web looking at various files like web pages, robots.txt files, and others, the crawler 238 is configured to also look for quicklinks. For any web page, the crawler 238 may read any number of quick-link URLs, and associated quicklink titles, if appropriate, that may be explicitly specified through one or more of the mediums described above or others by webmasters. The crawler 238 then associates these quick-links with the appropriate web page. This can be the web page the quick-links information is found on (e.g., Meta tags or robots.txt files) or, in some cases, the web page that the quicklinks are specified for (e.g., sitemaps or HTML A tags). Similarly, quick-links may work at the site level (e.g., robots.txt files or sitemaps) or at the HTML level (e.g., Meta tags or HTML A tags).

Upon recognition of a quick-link, the associated web page content may be received by the web page content receiving component 232 and the web page and associated quick-link (s) may be indexed by the indexing component 234 and the index may be stored, for instance, in association with data store 236. Generally, in addition to the web page content, an identifier for the web page is also associated therewith. Such identifier may include, without limitation, the web site URL and a text blurb summarizing the web page content or taken directly from content on the web page. Generally, this identifier is presented when the web site surfaces as a result of a search query. Thus, the data store 236 is configured to store information associated with various web pages associated with a variety of web sites. In various embodiments, such information may include one or more Uniform Resource Locators (URLs) that identify web pages, explicitly-specified site-link data, context-aware titles associated with site-link data, presentation conditions associated with site-link data, web site and/or web page identifiers, and the like. It will be understood and appreciated by those of ordinary skill in the art that the information stored in the data store 236 may be configurable and may include any information relevant to web pages and corresponding site-link data that may be extracted for indexing. Further, though illustrated as a single, independent component, data store 236 may, in fact, be a plurality of data stores, for instance, a database cluster, portions of which may reside on a computing device associated with the search engine 214 (as shown), a computing device associated with the web server 212, another external computing device (not shown), and/or any combination thereof. Once indexed, information pertaining to the web page and associated quicklink(s) is capable of being searched to determine if the web page is relevant to a received search query, as more fully described below.

The query receiving component 228 is configured for receiving search queries, that is, sets of words or characters that specify criteria or identify desired concepts for which matching documents are desired. Generally, the query receiving component 228 receives search queries input by a user, for instance, associated with user device 216. Thus, the user device 216 is configured for transmitting search queries to the search engine 214.

The query response determining component 230 is configured for determining a list of items (e.g., documents) that meet the criteria specified in a received search query. In embodiments, such determining includes calculating item relevance (e.g., utilizing an index associated with the search engine 214) and determining if relevant items have quick-link data associated therewith. In embodiments, the webmaster-specified site-link data may be utilized by the query response determining component 230 to aid in determining a relevance rank for the associated web page as it pertains to the received search query. If it is determined that one or more of the relevant item has quick-link data associated therewith, the query response determining component is further configured for transmitting such relevant items and associated quick-link data for presentation in association with the user device 216. Thus, the user device 216 is further configured for receiving and presenting search query results to a user. The query response determining component 230 further is configured to read and interpret any presentation conditions associated with identified quicklink data and for transmitting only that quick-link data for which such conditions are satisfied for presentation.

Search query results and associated quick-link data may be presented in any number of ways including, without limitation, a vertical display 600 as shown in the exemplary partial screen display of FIG. 6 and a horizontal display 700 as shown in the exemplary partial screen display of FIG. 7. In the screen display shown in FIG. 6, at least a portion of the quicklink URL (e.g., www.examplenews.com/pages/world/index.h . . . ) and the associated quicklink context-aware title (e.g., "World") are both displayed in the screen display shown in FIG. 7, only the quicklink context aware titles (e.g., "World", "Opinion", etc.) are displayed. Any and all such variations are contemplated to be within the scope of embodiments hereof. User selection of the context-aware titles in either screen display 600, 700 results in the user being directed to the web page associated with the corresponding quick-link URL.

Figure 3:
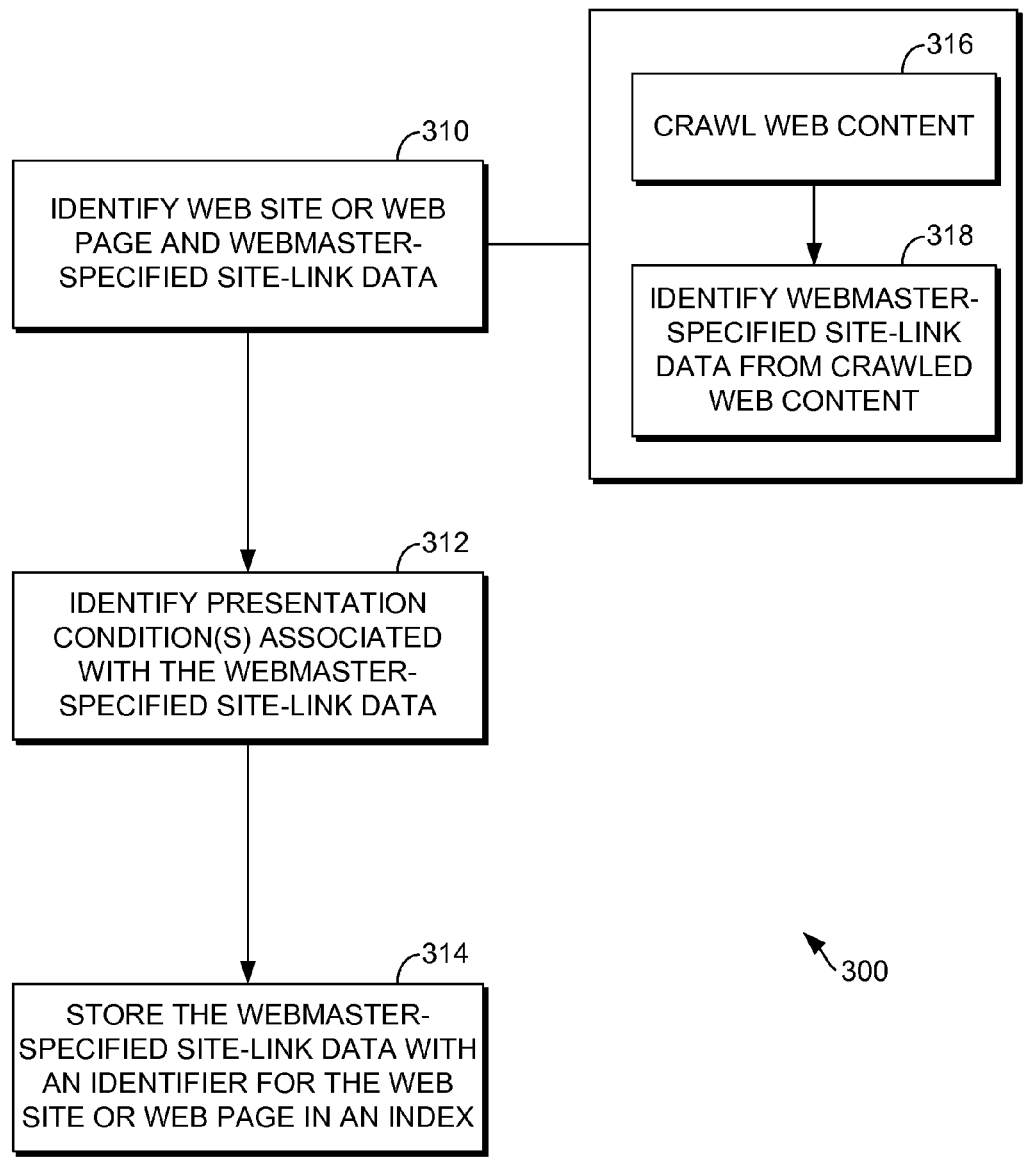
FIG. 3 is a flow diagram showing a method for indexing explicitly-specified quick-link data in association with a web page, in accordance with an embodiment of the present invention.

Turning now to FIG. 3, a flow diagram is illustrated showing a method 300 for indexing explicitly-specified quick-link data in association with a web page, in accordance with an embodiment of the present invention. Initially, as indicated at block 310, a web site and/or web page and associated site-link data are identified. In embodiments, such identification may comprise crawling web content (for instance, utilizing crawler 238 of FIG. 2) as indicated at block 316, and identifying the site-link data from the crawled web content, as indicated at block 318.

Subsequently, at least one presentation condition associated with the site-link data is identified. This is indicated at block 312. Once the web site and/or web page, associated site-link data and presentation condition(s) are identified, the site-link data and presentation condition(s) are indexed (e.g., utilizing indexing component 234 of FIG. 2) and stored in association with an identifier for the web page (e.g., in association with data store 236 of FIG. 2). This is indicated at block 314.

Figure 4:
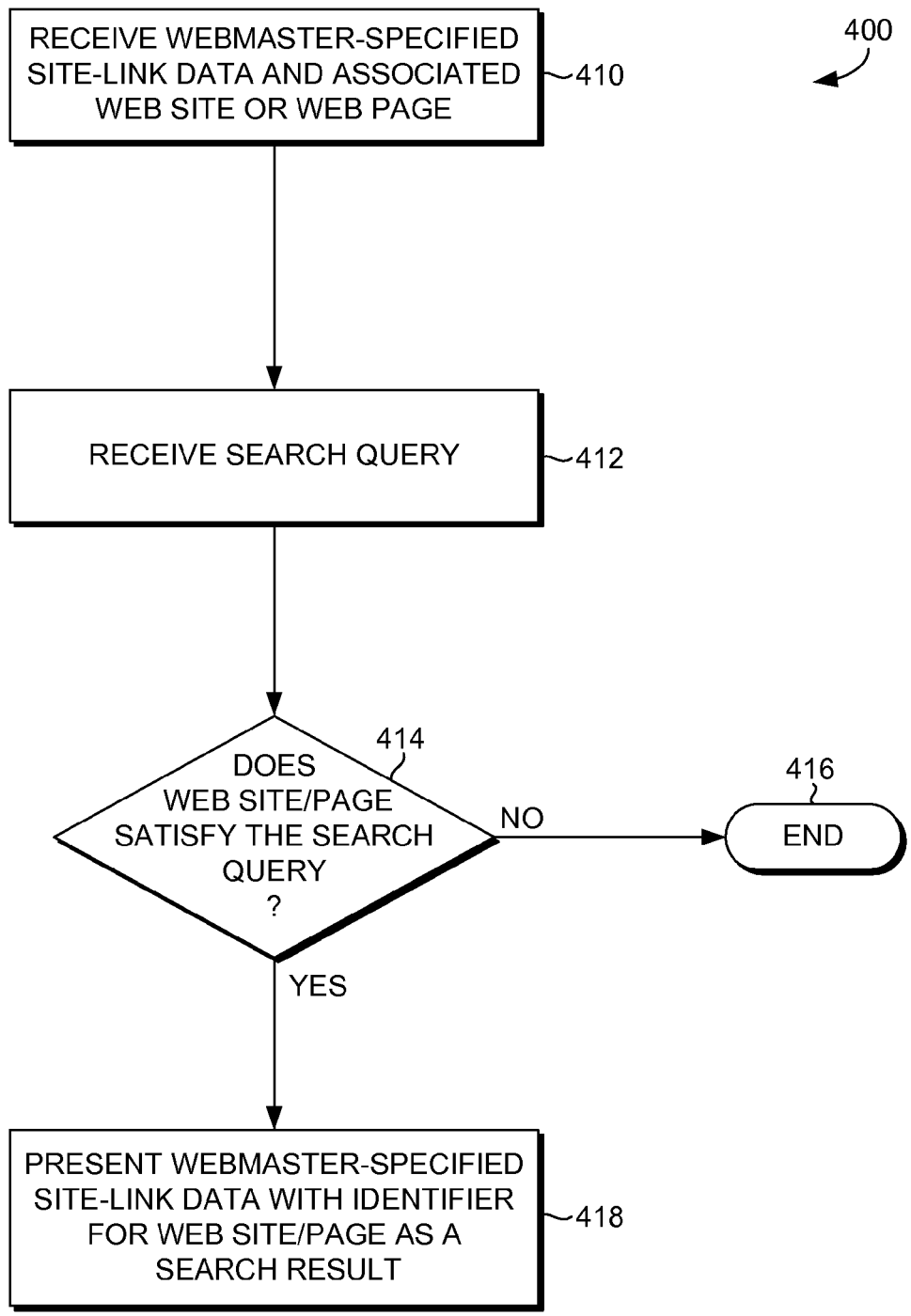
FIG. 4 is flow diagram showing a method for presenting explicitly-specified quick-link data in association with search results, in accordance with an embodiment of the present invention.

With reference to FIG. 4, a flow diagram is illustrated showing a method 400 for presenting explicitly-specified quick-link data in association with search results, in accordance with an embodiment of the present invention. Initially, as indicated at block 410, explicitly-specified site-link data and the associated web page (or an identifier therefore) are received. Generally, such site-link data and the associated web site or web page (or identifier) is stored in association with one another in an index or the like. Subsequently, as indicated at block 412, a search query is received, for instance, utilizing query receiving component 228 of FIG. 2.

It is next determined if the web page satisfies the search query, as indicated at block 414. This determination is made, for instance, utilizing query response determining component 230 of FIG. 2. If it is determined that the web page does not satisfy the search query, the method ends, as indicated at block 416. If, however, it is determined that the web page does satisfy the search query, the site-link data and the identifier for the web page are presented as search results, for instance, in association with user device 216 of FIG. 2. This is indicated at block 418.

Figure 5:
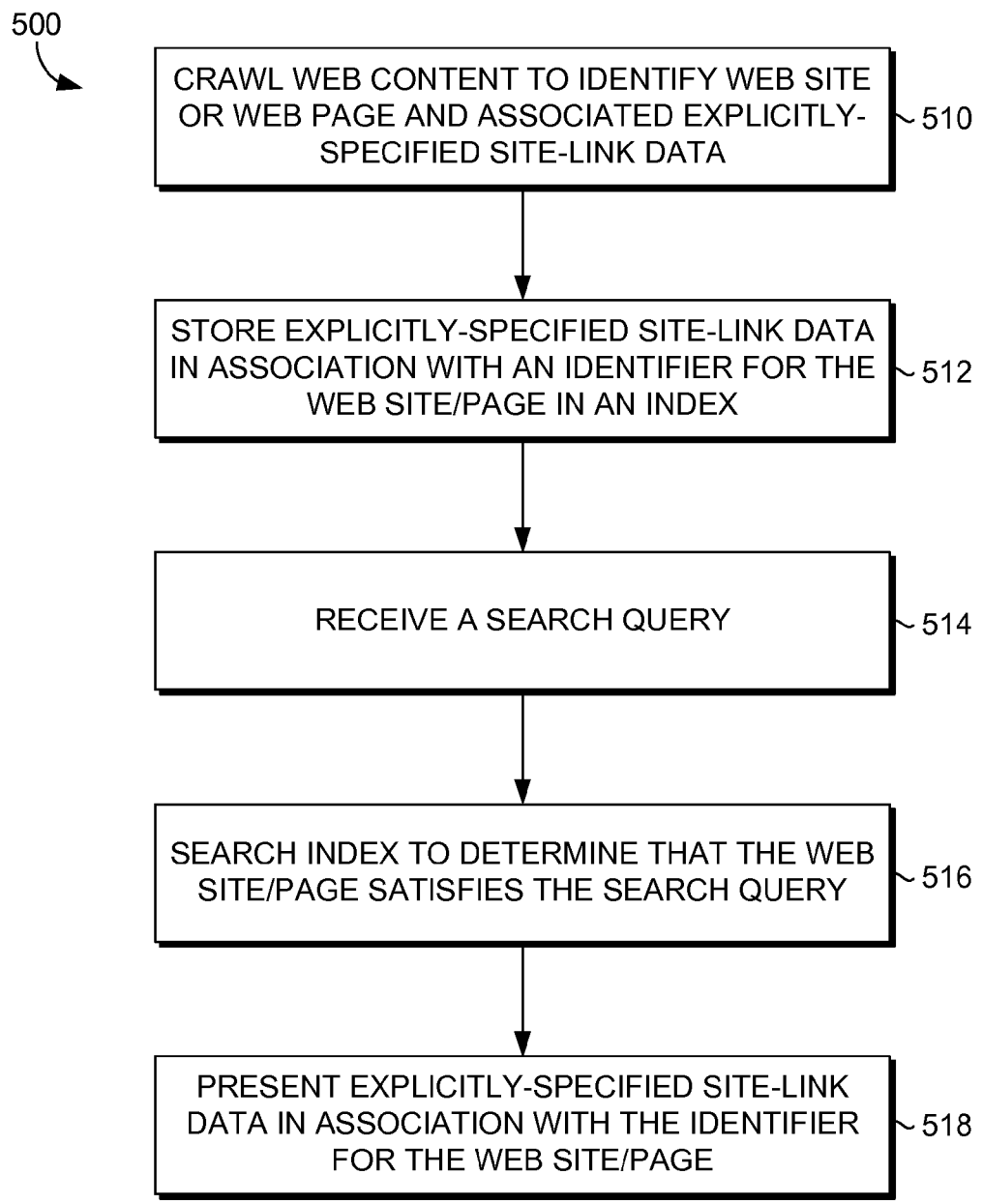
FIG. 5 is a flow diagram showing a method for identifying and presenting explicitly-specified quick-link data in association with search results, in accordance with an embodiment of the present invention.

Turning now to FIG. 5, a flow diagram is illustrated showing a method 500 for identifying and presenting explicitly-specified site-link data in association with search results, in accordance with an embodiment of the present invention. Initially, as indicated at block 510, web content is crawled to identify web pages and/or web sites and their associated site-link data. Subsequently, the site-link data is indexed (e.g., utilizing indexing component 234 of FIG. 2) and stored (for instance, in association with data store 236 of FIG. 2) in association with an identifier for the web page. This is indicated at block 512. Subsequently, as indicated at block 514, a search query is received, for instance utilizing query receiving component 228 of FIG. 2.

Next, the index is searched to determine whether or not the web page or web site satisfies the received search query, for instance, utilizing query response determining component 230 of FIG. 2. This is indicated at block 516. If it is determined that the web page or web site satisfies the search query, the site-link data and the associated web page or web site identifier are presented, for instance, in association with user device 216 of FIG. 2. This is indicated at block 518.

As can be understood, embodiments of the present invention provide systems, methods, and computer storage media having computer-executable instructions embodied thereon for permitting webmasters or others involved in the building of a web site to explicitly specify links or other web pages that the webmaster believes users that visit the web site are interested in viewing. Such links or other web pages are referred to herein as "site-link data" "quick-link data", or "quicklinks". Embodiments of the present invention further relate to systems and methods for identifying such explicitly-specified site-link data (or quick-links) upon crawling the web site, indexing the quick-link in association with the appropriate web page and/or web site, and exposing at least a portion of such quick-link data when the associated web site and/or web page surfaces as the result of an input search query.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer readable storage media having computer-executable instructions embodied thereon for performing a method for indexing and presenting explicitly-specified site-link data in association with a web page, the method comprising:
   examining, with a webmaster tool, site visit logs for a web page;
   automatically generating, by the webmaster tool, explicitly-specified site-link data including at least one Uniform Resource Locator, one or more presentation conditions, and a context-aware title that is associated with and describes the at least one Uniform Resource Locator;
   identifying a web page having explicitly-specified site-link data associated therewith; and
   storing each at least one Uniform Resource Locator in association with an identifier for the web page in an index;
   receiving a search query;
   determining the at least one associated web page satisfies the search query;
   presenting at least a portion of the explicitly-specified site-link data and an identifier for the at least one associated web page, wherein the explicitly-specified site-link data is selectable to initiate navigation to a web page associated with the Uniform Resource Locator;
   wherein the web page includes the explicitly-specified site-link data specified at a site level, and wherein identifying the web page having the explicitly-specified site-link data associated therewith comprises identifying the explicitly-specified site-link data in at least one of a sitemap or a robots.txt file associated with the web page; and
   determining a rank for the associated web page based on the explicitly-specified site-link data.

2. The one or more computer readable storage media of claim 1, wherein storing each at least one Uniform Resource Locator further comprises storing the context-aware title in association with the at least one Uniform Resource Locator.

3. The one or more computer readable storage media of claim 1, wherein storing each at least one Uniform Resource Locator in association with the identifier for the web page in an index comprises storing each at least one presentation condition in association with the at least one Uniform Resource Locator and the identifier for the web page in an index.

4. The one or more computer readable storage media of claim 1, wherein identifying the web page having explicitly-specified site-link data associated therewith comprises crawling web content and identifying the site-link data from the crawled web content.

5. The one or more computer readable storage media of claim 1, wherein the web page includes the explicitly-specified site-link data specified at a site level or the explicitly-specified site-link data specified at a HyperText Markup Language level.

6. The one or more computer readable storage media of claim 5, wherein the associated web page includes the explicitly-specified site-link data specified at a HyperText Markup Language level, and wherein identifying the web page having explicitly-specified site-link data associated therewith comprises identifying the explicitly-specified site-link data in a HyperText Markup Language tag or another specific location within HyperText Markup Language associated with the web page, or a combination thereof.

7. A computerized method for presenting explicitly-specified site-link data in association with search results, the method comprising:
   examining, with a webmaster tool, site visit logs for a web page;
   automatically generating, by the webmaster tool, explicitly-specified site-link data, including at least one Uniform Resource Locator, one or more presentation conditions, and a context-aware title that is associated with and describes the at least one Uniform Resource Locator;
   receiving a search query;
   identifying a web page having explicitly-specified site-link data and at least one associated web page;
   identifying a web page having explicitly-specified site-link data associated therewith;
   storing each at least one associated web page in association with an identifier for the web page in an index;
   determining the at least one associated web page satisfies the search query;
   presenting at least a portion of the explicitly-specified site-link data and an identifier for the at least one associated web page wherein the explicitly-specified site-link data is selectable to initiate navigation to the at least one associated web page;
   wherein the web page includes the explicitly-specified site-link data specified at a site level, and wherein identifying the web page having the explicitly-specified site-link data associated therewith comprises identifying the explicitly-specified site-link data in at least one of a sitemap or a robots.txt file associated with the web page; and
   determining a rank for the associated web page based on the explicitly-specified site-link data.

8. The computerized method of claim 7, wherein the explicitly-specified site-link data is selectable to initiate navigation to a web page associated with the Uniform Resource Locator.

9. The computerized method of claim 8, further comprising: detecting selection of the explicitly-specified site-link data; and navigating to the web page associated with the Uniform Resource Locator.

10. The computerized method of claim 7, wherein the associated web page includes the explicitly-specified site-link data specified at a site level or the explicitly-specified site-link data specified at a HyperText Markup Language level.

11. The computerized method of claim 10, wherein the associated web page includes the explicitly-specified site-link data specified at a HyperText Markup Language level, and wherein receiving the explicitly-specified site-link data and at least one associated web page comprises receiving the explicitly-specified site-link data specified in a HyperText Markup Language tag or another specific location within HyperText Markup Language associated with the web page, or a combination thereof.

12. The computerized method of claim 7, wherein presenting at least a portion of the explicitly-specified site-link data and the identifier of the at least one associated web page comprises presenting at least a portion of the explicitly-specified site-link data that is dependent on both the identifier for the at least one associated web page and at least one characteristic of the search query received.

* * * * *